(12) United States Patent
Miyakawa et al.

(10) Patent No.: US 11,189,978 B2
(45) Date of Patent: Nov. 30, 2021

(54) CONNECTOR AND WIRE HARNESS

(71) Applicants: YAZAKI CORPORATION, Tokyo (JP); HONDA MOTOR CO., LTD., Tokyo (JP)

(72) Inventors: Tomoyuki Miyakawa, Utsunomiya (JP); Kozo Oishi, Utsunomiya (JP); Kazuyuki Ochiai, Asaka (JP); Daisuke Fujihira, Asaka (JP); Shintaro Matsuda, Asaka (JP)

(73) Assignees: YAZAKI CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/879,724

(22) Filed: May 20, 2020

(65) Prior Publication Data
US 2020/0373718 A1 Nov. 26, 2020

(30) Foreign Application Priority Data
May 24, 2019 (JP) .............................. JP2019-097910

(51) Int. Cl.
| | | |
|---|---|---|
| *H01R 29/00* | (2006.01) | |
| *H01R 31/08* | (2006.01) | |
| *H01R 13/50* | (2006.01) | |
| *B60R 16/02* | (2006.01) | |
| *H01R 13/42* | (2006.01) | |
| *H01R 13/18* | (2006.01) | |
| *H01R 13/64* | (2006.01) | |

(52) U.S. Cl.
CPC ......... *H01R 31/08* (2013.01); *B60R 16/0207* (2013.01); *H01R 13/18* (2013.01); *H01R 13/42* (2013.01); *H01R 13/50* (2013.01); *H01R 13/64* (2013.01)

(58) Field of Classification Search
CPC .............. H01R 2103/00; H01R 13/641; H01R 13/4223
USPC .......................... 439/188, 489, 595; 200/51.1
See application file for complete search history.

(56) References Cited

U.S. PATENT DOCUMENTS 7,901,229 B2 *   3/2011   Nakamura ........... H01R 13/641
                                                    439/188

FOREIGN PATENT DOCUMENTS

JP           5599300 B2    10/2014

* cited by examiner

*Primary Examiner* — Phuong Chi Thi Nguyen
(74) *Attorney, Agent, or Firm* — Kenealy Vaidya LLP

(57) ABSTRACT

A connector includes: a housing; and a short-circuit terminal. A deformable portion is configured to deform in a direction of moving away from the terminal during housing of the terminal and to deform in a direction of moving closer to the terminal when the housing of the terminal is finished. The short-circuit terminal has, as different portions, a contact point portion to contact with the two or more terminals and a push target portion to contact with the deformable portion. The short-circuit terminal is configured to reduce its pressure of contact toward the terminal at the contact point portion, during the housing of the terminal, due to a movement of the push target portion along with the deformable portion.

4 Claims, 11 Drawing Sheets

CONNECTOR AND WIRE HARNESS

CROSS-REFERENCES TO RELATED APPLICATION(S)

This application is based on and claims priority from Japanese Patent Application No. 2019-097910 filed on May 24, 2019, and the entire contents of which are incorporated herein by reference.

BACKGROUND

Field of the Invention

The present invention relates to a connector that is equipped with a housing having plural terminal housing chambers and a short-circuit terminal that electrically shorts two or more terminals housed in two or more respective terminal housing chambers as well as to a wire harness in which such a connector is employed.

Description of Related Art

Connectors are known that are equipped with a short-circuit terminal that electrically shorts particular terminals from the viewpoints of, for example, preventing unintended conduction between those terminal. For example, a connector of this type is used in a circuit for activating an inflator of a vehicular airbag and serves to prevent erroneous activation of the inflator due to static electricity.

As for details of the above connector, refer to JP 5,599,300 B.

SUMMARY

Incidentally, in connectors having a short-circuit terminal as described above, usually terminals are housed in respective terminal housing chambers after the short-circuit terminal is attached to a housing so that contact portions of the short-circuit terminal are exposed in the insides of the associated terminal housing chambers. This establishes a state the short-circuit terminal is pressed against the associated terminals, whereby the electrical connections between the short-circuit terminal and the terminals (i.e., the state that particular terminals are short-circuited with each other) are maintained reliably even if external force such as vibration acts on the connector.

However, because of the above structure of the connector, in housing the terminals in the respective terminal housing chambers, the terminals are pushed into the terminal housing chambers while the short-circuit terminal is pushed out of the associated terminal housing chambers. As a result, if the force for pressing the short-circuit terminal against the associated terminals to increase the certainty of the electrical connections between the short-circuit terminal and the terminals, the force necessary to house the terminals in the respective terminal housing chambers (hereinafter also referred to as "terminal insertion force") is increased. In other words, in conventional connectors, it is difficult to increase both of the certainty of electrical connections between the short-circuit terminal and the associated terminals and the efficiency of work of housing the terminals in the respective terminal housing chambers.

An object of the invention is to provide a connector capable of increasing both of the certainty of electrical connections between a short-circuit terminal and associated terminals and the efficiency of work of housing terminals in respective terminal housing chambers, as well as a wire harness in which such a connector is employed.

Embodiments of the present invention provide the following items [1] to [4]:

[1] A connector comprising:
  a housing having a plurality of terminal housing chambers;
  a short-circuit terminal configured to contact two or more terminals housed in two or more of the plurality of terminal housing chambers to electrically short the two or more terminals; and
  a deformable portion configured to deform in a direction of moving away from the terminal during housing of the terminal and to deform in a direction of moving closer to the terminal upon the housing of the terminal is finished,
  the short-circuit terminal having, as different portions, a contact point portion to contact with the two or more terminals and a push target portion to contact with the deformable portion,
  the short-circuit terminal being configured to reduce its pressure of contact toward the terminal at the contact point portion, during the housing of the terminal, due to a movement of the push target portion along with the deformable portion being deformed in the direction of moving away from the terminal.

[2] The connector according to the item [1], wherein the short-circuit terminal is configured so that the contact point portion goes away from the terminal during the housing of the terminal and that the contact point portion comes into contact with the terminal upon the housing of the terminal is finished.

[3] The connector according to item [1] or the item [2], wherein:
  the deformable portion have, as different portions, a beam-shaped elastically deformable support portion extending in a terminal housing direction and a contact portion moving along with the support portion and contacting the terminal to lock the terminal; and
  the support portion pushes the push target portion of the short-circuit terminal and deforms the short-circuit terminal to reduce the pressure of contact toward the terminal at the contact point portion, during the housing of the terminal, due to a movement of the support portion by being pushed by the terminal in the direction of moving away from the terminal.

[4] A wire harness comprising:
  the connector according to any one of the item [1] to the item [3]; and
  a plurality of electric wires each configured to have the terminal housed in the terminal housing chamber.

According to first aspect of the invention, relating to the item [1], when the terminals are housed in the respective terminal housing chambers, the deformable portions that are deformed in such a direction as to go away from the associated terminals come into contact with the respective push target portions of the short-circuit terminal. Then the short-circuit terminal is deformed in link with movements of the deformable portions so that the pressure of contact of the contact point portions of the short-circuit terminal with the associated terminals is made lower. This makes it possible to make the terminal insertion force lower than in a conventional connector in which a short-circuit terminal is merely pushed out toward the outside of the associated terminal housing chambers by an amount corresponding to the decrease of the above contact pressure. Thus, the connector having this configuration makes it possible to increase both of the certainty of electrical connections between the short-circuit terminal and the associated terminals and the efficiency of work of housing the terminals in the terminal housing chambers.

Incidentally, in the above-configured connector, the short-circuit terminal may be deformed by the deformable portions either until the short-circuit terminal leaves the associated terminals completely or by such a degree that the contact pressure is low though the short-circuit terminal is in contact with the associated terminals. The details of the principle of how to change the contact pressure of the short-circuit terminal will be described later in detail (with reference to FIGS. 11A and 11B).

According to second aspect of the invention, relating to the item [2], the short-circuit terminal continues to be deformed until the deformable portions causes the short-circuit terminal to leave the associated terminals completely. This prevents the short-circuit terminal from obstructing housing of the associated terminals in the respective terminal housing chambers. Thus, the connector having this configuration makes it possible to increase the efficiency of work of housing the terminals in the terminal housing chambers further. Incidentally, in the connector having this configuration, since when housing of the associated terminals is completed the push target portions of the short-circuit terminal are moved in link with the deformable portions being deformed so as to come closer to the associated terminals, whereby the pressure of contact of the contact point portions with the associated terminals is increased (i.e., the short-circuit terminal that have been separated from the associated terminals are pressed against the associated terminals).

According to third aspect of the invention, relating to the item [3], each deformable portion has a beam-shaped support portion capable of elastic deformation (i.e., a portion having an elastic warping function) and a contact portion that is moved in link with the support portion and locks the associated terminal by coming into contact with it (i.e., a portion having a lock function). The push target portions of the short-circuit terminal are pushed by the respective support portions, whereby the short-circuit terminal is deformed so that the pressure of contact of the short-circuit terminal with the associated terminals is made lower. As such, each deformable portion has what is called a lance function in addition to the above-described function of lowering the contact pressure.

Furthermore, since each deformable portion is provided with, as different portions, the portion (support portion) for pushing down a push target portion of the associated short-circuit terminal and the portion (contact portion) for locking the terminal in the associated terminal housing chamber, each deformable portion can be designed so that its individual portions are given shapes and positions that are suitable for their respective functions. As a result, the degree of freedom of designing of each deformable portion is made higher than in a case that both of the above functions are realized by a single portion, making it possible to increase both of the certainty of electrical connections between the short-circuit terminal and the associated terminals and the efficiency of work of housing the terminals in the respective terminal housing chambers.

According to fourth aspect of the invention, relating to the item [4], when the terminals are housed in the respective terminal housing chambers of the connector, the deformable portions (e.g., beam-shaped lances) that are deformed in such a direction as to go away from the associated terminals come into contact with the respective push target portions of the short-circuit terminal. Then the short-circuit terminal is deformed in link with movements of the deformable portions so that the pressure of contact of the contact point portions of the short-circuit terminal with the associated terminals is made lower. This makes it possible to make the terminal insertion force lower than in a conventional connector in which the short-circuit terminal is merely pushed out toward the outside of the associated terminal housing chambers by the associated terminals by an amount corresponding to the decrease of the above contact pressure. Thus, equipped with the above connector, the wire harness having this configuration makes it possible to increase its productivity while avoiding, for example, unintended conduction between the terminals corresponding to the short-circuit terminal.

As described above, the invention can provide a connector capable of increasing both of the certainty of electrical connections between a short-circuit terminal and associated terminals and the efficiency of work of housing terminals in respective terminal housing chambers, as well as a wire harness in which such a connector is employed.

The invention has been described above concisely. The details of the invention will become more apparent when the modes for carrying out the invention (hereinafter referred to as an embodiment) described below are read through with reference to the accompanying drawings.

BRIEF DESCRIPTION OF THE DRAWINGS

FIG. 11A shows a case of a comparative example in which no pushing-down is performed and FIG. 11B shows a case of the embodiment in which pushing-down is performed.

DETAILED DESCRIPTION

Embodiment

A connector 1 and a wire harness employing the connector 1 according to an embodiment of the present invention will be hereinafter described with reference to the drawings.

Figure 1:
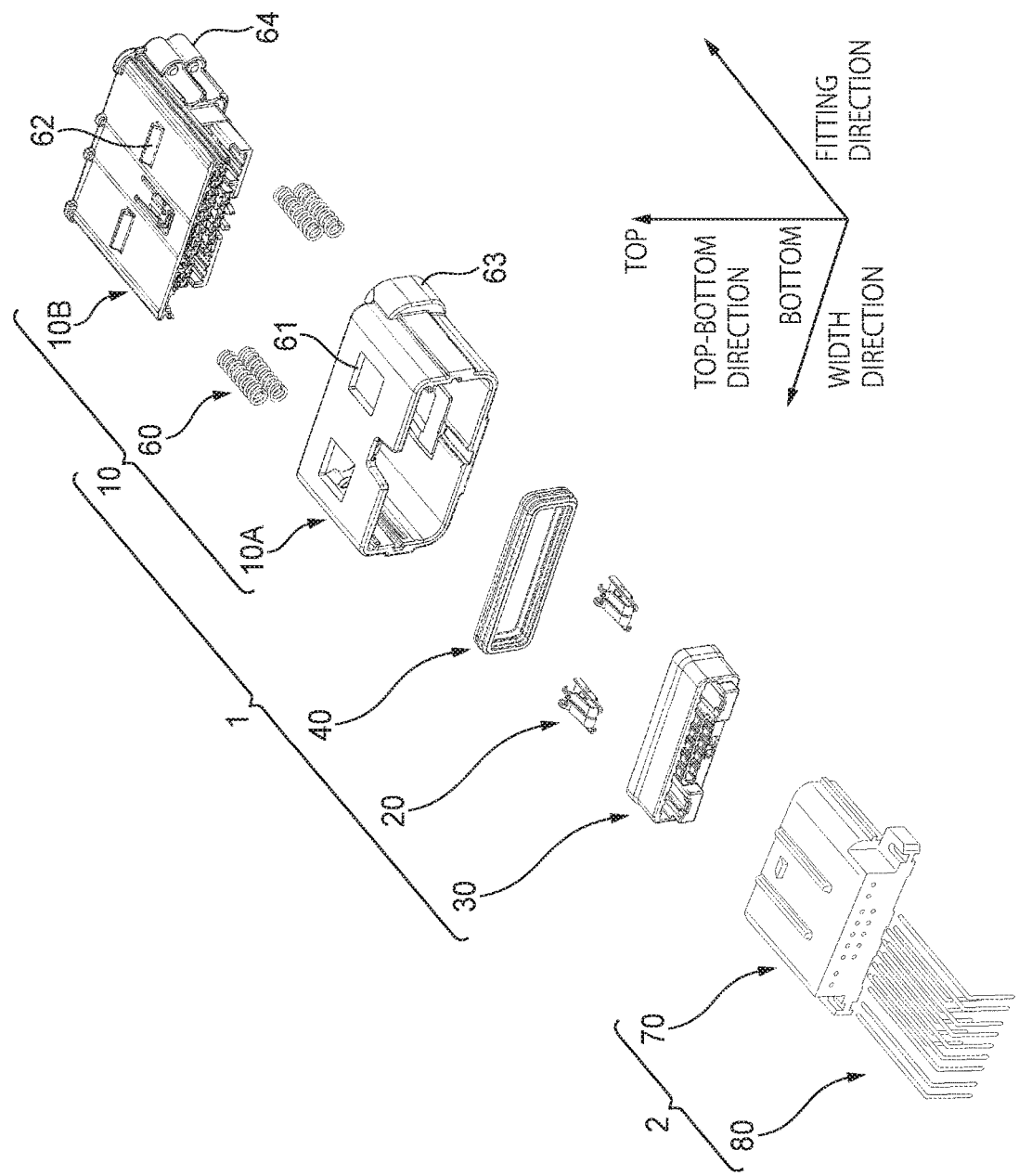
FIG. 1 is an exploded perspective view of a connector according to an embodiment of the present invention.

As shown in FIG. 1, a housing 10 of the connector 1 is configured so as to be fitted with a counterpart housing 70 of a counterpart connector 2. When the connector 1 (housing 10) is fitted with the counterpart connector 2 (counterpart housing 70), terminals 50 (female terminals; see FIGS. 9A and 9B and FIGS. 10A and 10B) housed in the housing 10 are electrically connected to respective counterpart terminals 80 (male terminals) housed in the counterpart housing 70, whereby electric wires (not shown) connected to the terminals 50 are electrically connected to respective electric wires (not shown) connected to the counterpart terminals 80.

For convenience of description, the fitting direction, the width direction, and the top-bottom direction as well as the top side and the bottom side are defined as shown in FIG. 1. The fitting direction, the width direction, and the top-bottom direction are perpendicular to each other. The fitting direction is the same as the direction in which the connector 1 is fitted with the counterpart connector 2. The front side of the connector 1 is the side in which the counterpart connector 2 is brought closer to it in the fitting direction and the rear side of the connector 1 is the side opposite to the front side, that is, the back side, in the fitting direction.

As shown in FIG. 1, the connector 1 includes the housing 10, a pair of short-circuit terminals 20 and a front holder 30 that are attached to the housing 10, respectively. The structures of these components constituting the connector 1 will be described below one by one.

First, the housing 10 will be described. As shown in FIG. 1, the housing 10 is composed of a resin outer housing 10A, a resin inner housing 10B, and plural (in this example, four) metal springs 60. Assembling of the housing 10 is completed by locking lock projections 62 of the inner housing 10B on respective lock holes 61 of the outer housing 10A in a state that the springs 60 are held between spring holding portions 63 of the outer housing 10A and the spring holding portions 64 of the inner housing 10B in the fitting direction, respectively (the springs 60 are compressed and the outer housing 10A and the inner housing 10B counter elastic forces of the springs 60).

Figure 2:
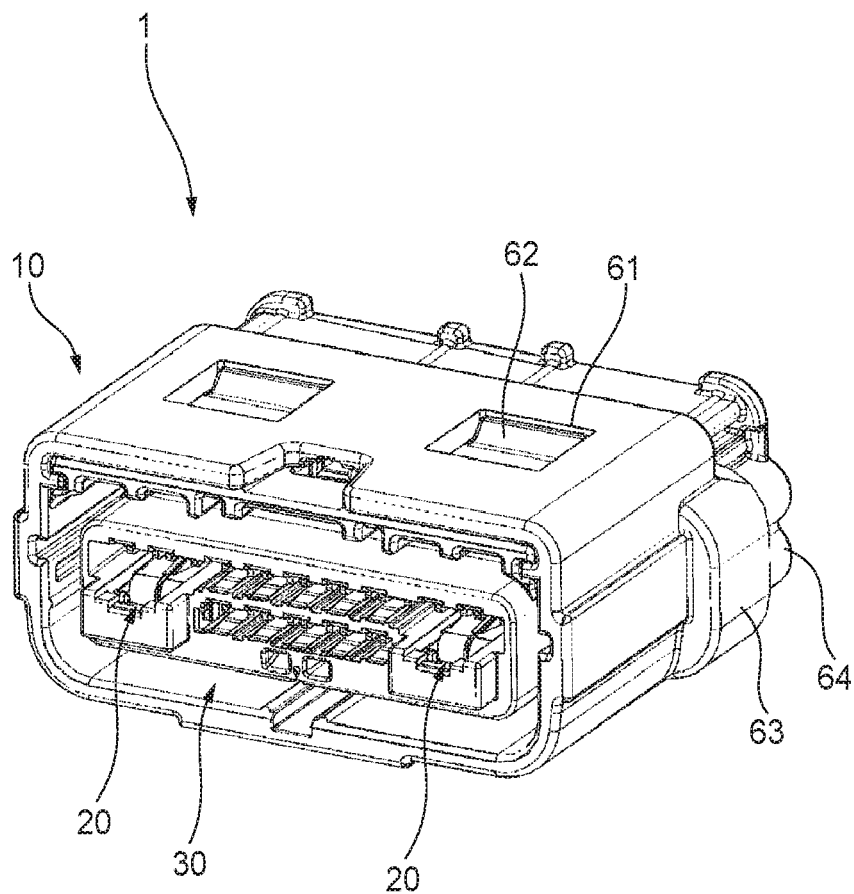
FIG. 2 is a perspective view of the connector according to the embodiment of the invention.
Figure 3A:
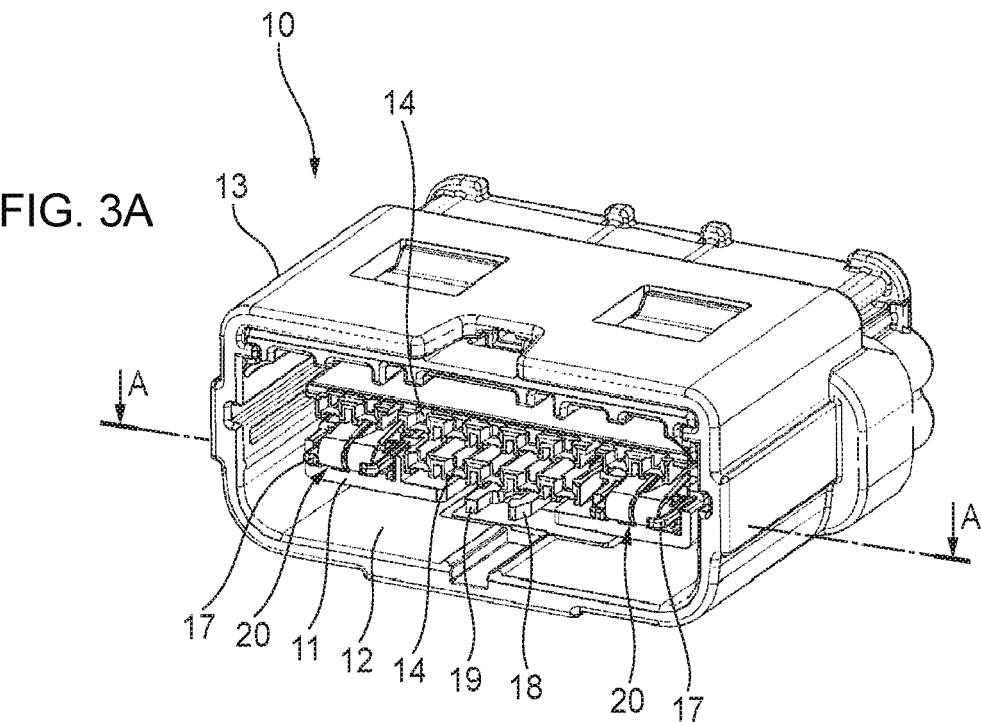
FIG. 3A is a perspective view of the connector in a state that a front holder is not incorporated in it.
Figure 3B:
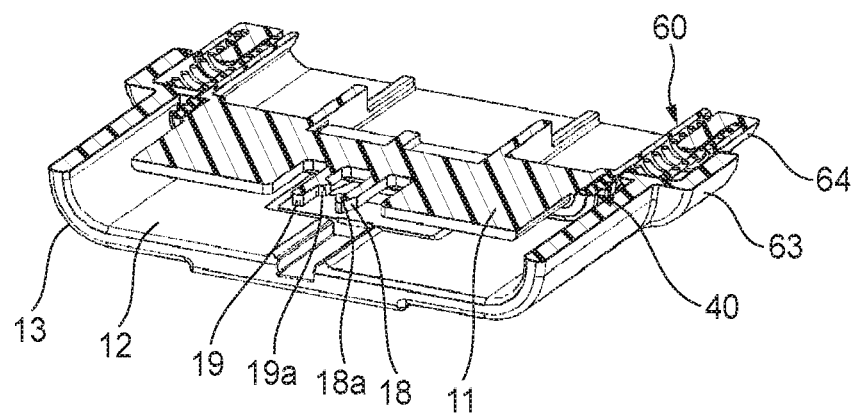
FIG. 3B is a perspective view having an A-A cross section of FIG. 3A.

As shown in FIG. 2 and FIGS. 3A and 3B, the housing 10 is equipped with a terminal housing portion 11 (inner housing 10B) that is approximately shaped like a cuboid and an outer cylinder portion 13 (outer housing 10A) that is approximately shaped like a rectangular cylinder and covers the outer circumference of the terminal housing portion 11 via a ring-shaped space 12 having an opening on the front side. The ring-shaped space 12 functions as a space into which a frame portion 31 (described later in detail) of the front holder 30 is inserted when the front holder 30 is attached to the inner housing 10B.

As shown in FIG. 3A, terminal housing chambers 14 for housing the respective terminals 50 (see FIGS. 9A and 9B and FIGS. 10A and 10B) are formed in the terminal housing portion 11 so as to extend in the fitting direction. In this example, the plural terminal housing chambers 14 are arranged in the width direction and in two stages in the top-bottom direction. More specifically, in the bottom stage, five terminal housing chambers 14 are arranged in the width direction in a central portion of the terminal housing portion 11 excluding both its end portions in the width direction. In the top stage, nine terminal housing chambers 14 are arranged in the width direction in approximately the entire expanse of the terminal housing portion 11 in the width direction.

As shown in FIGS. 7A and 7B and FIGS. 8A and 8B, each terminal housing chamber 14 is provided with a lock portion 15 approximately at its center in the fitting direction so that the lock portion 15 goes into the terminal housing chamber 14 from below. In this example, the lock portion 15 has a pair of double-supported beams 15a arranged in the width direction (see FIG. 7B in particular) and a lance 15b (see FIG. 8B in particular) located between the pair of double-supported beams 15a and integrated with them. As described later, the lock portion 15 is formed so as to be deformed away from the associated terminal 50 during housing of the terminal 50 into the terminal housing chamber 14 and to come closer to the terminal 50 when the housing of the terminal 50 in the terminal housing chamber 14 is completed.

Each double-supported beam 15a is a portion that extends in the fitting direction and can be deformed elastically in the top-bottom direction (i.e., exercises an elastic warping function). The lance 15b is disposed so as to be moved in the top-bottom direction together with the double-supported beams 15a and extends up forward (i.e., is inclined) so that its tip portion goes into the terminal housing chamber 14 slightly in a state that the double-supported beams 15a are not deformed elastically (i.e., the state shown in FIGS. 8A and 8B). The lance 15b is a portion to exercise a function of preventing the terminal 50 from coming off rearward (i.e., lock function) in such a manner a prescribed corner portion of the terminal 50 inserted in the terminal housing chamber 14 from the rear side is locked on a tip portion of the lance 15b.

When the terminal 50 is located at a regular insertion position (i.e., a state that the lance 15b is exercising its coming-off-preventing function) in the terminal housing chamber 14, the tip portion of the lance 15b goes into the corner portion of the terminal 50, whereby the pair of double-supported beams 15a and the lance 15b are kept in a state that they are not deformed elastically (they have postures shown in FIGS. 8A and 8B and 10A and 10B; hereinafter referred to as "original positions"). When the lance 15b is located at the original position, an associated detection portion 33 (described later in detail) of the front holder 30 can be inserted into a space 16 that faces a bottom side surface (i.e., a side surface opposite to the terminal housing chamber 14) of the lance 15b.

Figure 9A:
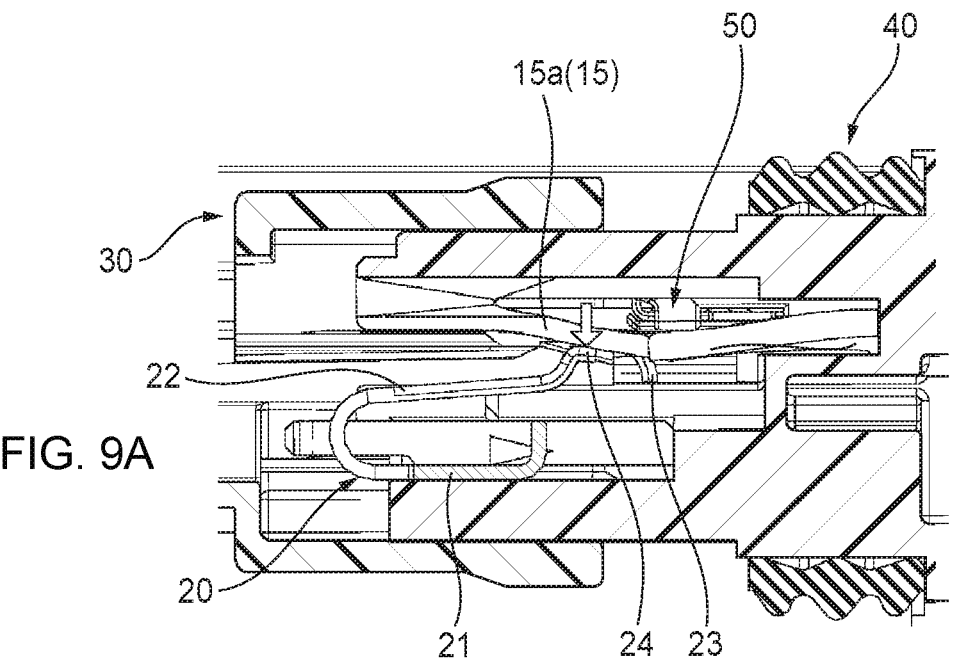
FIG. 9A is a sectional view corresponding to FIG. 7B in a state that the short-circuit target terminals are located at halfway insertion positions and FIG. 9B is a sectional view corresponding to FIG. 8B in a state that the short-circuit target terminals are located at halfway insertion positions.
Figure 9B:
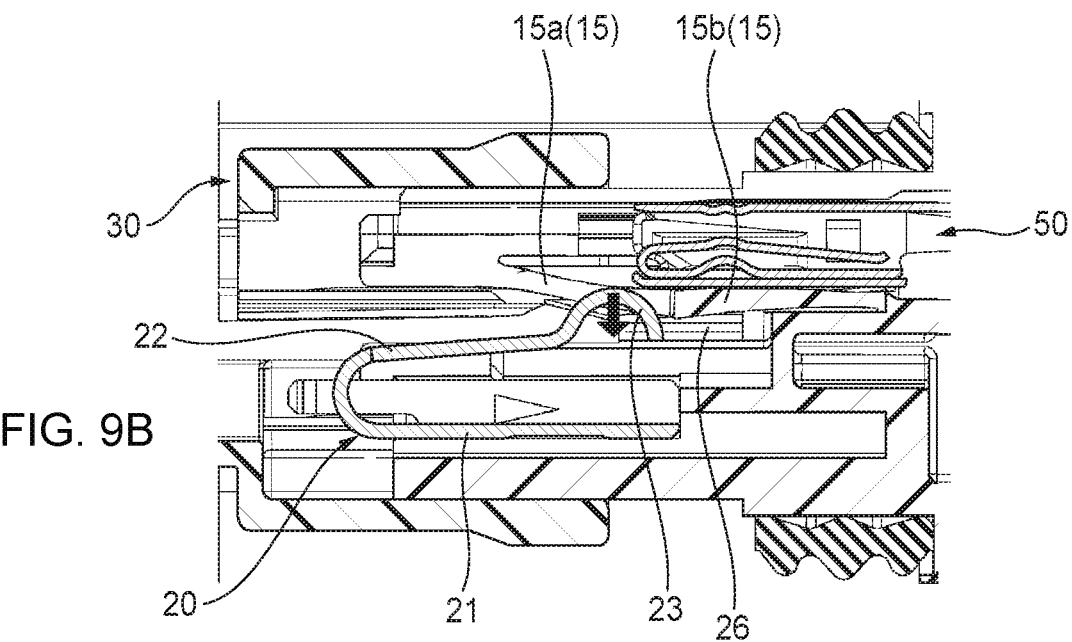

On the other hand, when the terminal 50 is located at a halfway insertion position (i.e., a state that the lance 15b is not exercising its coming-off-preventing function), the tip portion of the lance 15b cannot go into the corner portion of the terminal 50 and hence the pair of double-supported beams 15a and the lance 15b are kept in a state that they are deformed downward (i.e., in such a direction as to go away from the terminal housing chamber 14) elastically (they have postures shown in FIGS. 9A and 9B). In this state, the detection portion 33 of the front holder 30 interferes with the tip portion of the lance 15b that is deformed downward elastically, whereby the detection portion 33 of the front holder 30 cannot go into the space 16.

As shown in FIG. 3A, a pair of short-circuit terminal setting spaces 17 in which the short-circuit terminals 20 are to be set are formed outside, in the width direction, the five terminal housing chambers 14 in the bottom stage of the two (top and bottom) stages. As shown in FIGS. 7A and 7B and FIGS. 8A and 8B, each short-circuit terminal setting space 17 communicates with, in the top-bottom direction, spaces in front of the lances 15b in the pair of adjacent terminal housing chambers 14, located at one end in the width direction, of the nine terminal housing chambers 14 in the top stage.

In the following, for convenience of description, the pair of terminal housing chambers 14 that communicate with each short-circuit terminal setting space 17 in the top-bottom direction will be referred to particularly as "short-circuit target terminal housing chambers 14" and the terminals 50 to be inserted into the respective short-circuit target terminal housing chambers 14 may particularly be referred to as "short-circuit target terminals 50." The terminal housing chambers 14 that are not the short-circuit target terminal housing chambers 14 may be referred to as "ordinary terminal housing chambers 14" and the terminals 50 that are not the short-circuit target terminals 50 may be referred to as "ordinary terminals 50."

As shown in FIGS. 3A and 3B, a bottom portion of the terminal housing portion 11 is formed with, at the center in the width direction, a pair of cantilever-shaped elastic pieces 18 and 19 capable of elastic deformation in the width direction in such a manner that they are arranged in the width direction and extend forward. The pair of cantilever-shaped elastic pieces 18 and 19 are formed with respective projections 18a and 19a which project inward in the width direction. The projections 18a and 19a have a function of locking the front holder 30 at a tentative lock position and a true lock position. This function will be described later in detail.

Figure 4:
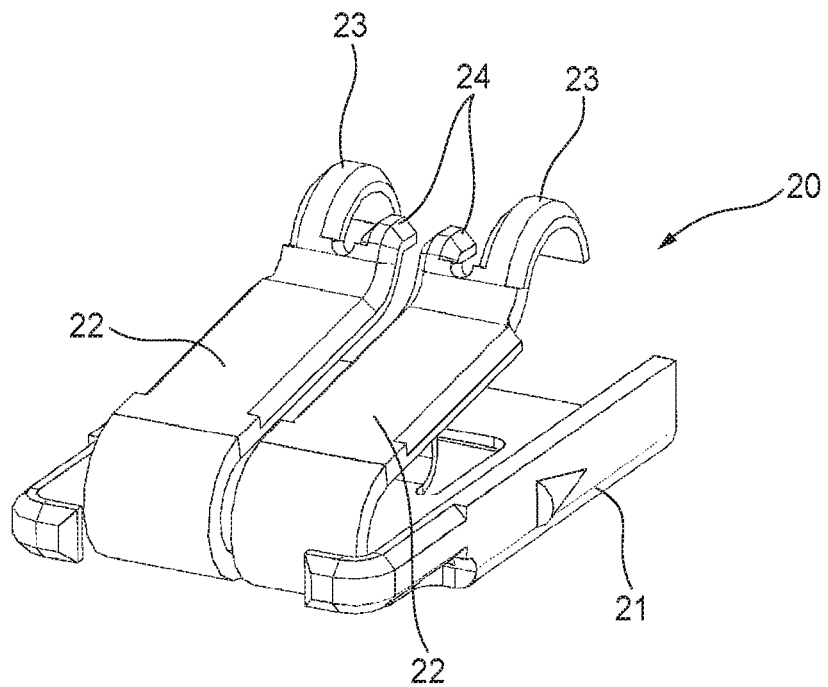
FIG. 4 is a perspective view of each short-circuit terminal shown in FIG. 1.

Next, the short-circuit terminals 20 will be described. As shown in FIG. 4, each metal short-circuit terminal 20 has, in a unitized manner, a flat-plate-shaped base portion 21 and a pair of contact pieces 22 which are bent upward from the front end of the base portion 21 and then extend rearward and can deform elastically. The pair of contact pieces 22 are arranged in the width direction. A tip portion (rear end portion) of each contact piece 22 is formed with a contact point portion 23 which is located outside in the width direction and curved so as to be convex upward and a push target portion 24 which is located inside in the width direction and projects upward slightly.

The short-circuit terminals 20 are inserted into the pair of short-circuit terminal setting spaces 17 of the housing 10 from the front side and set there. In a state that each short-circuit terminal 20 is set in the associated short-circuit terminal setting space 17, the pair of contact point portions 23 are to come into contact with the pair of short-circuit target terminals 50 that are inserted in the pair of short-circuit target terminal housing chambers 14 located over the pair of contact point portions 23, whereby the short-circuit target terminals 50 are short-circuited with each other (see FIG. 10B).

The pair of push target portions 24 are located right under two double-supported beams 15a in the associated pair of short-circuit target terminal housing chambers 14 (see FIG. 7B), respectively, so as to be pushed downward by the double-supported beams 15a when they are deformed downward elastically. This feature will be described later in detail.

Figure 5A:
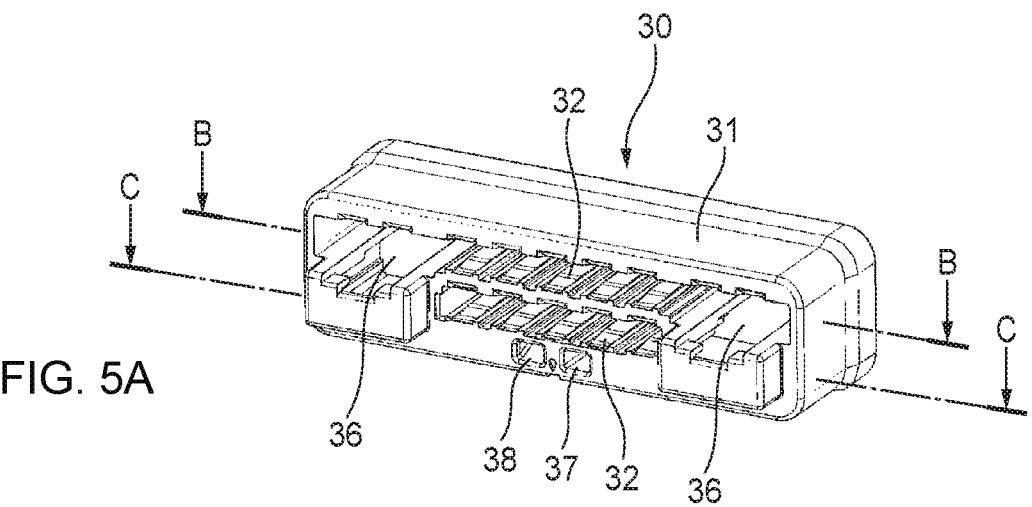
FIG. 5A is a perspective view of a front holder shown in FIG. 1.

Next, the front holder 30 will be described. As shown in FIG. 5A, the front holder 30 made of a resin has a rectangular-cylinder-shaped frame portion 31. Flat-plate-shaped detection plates 32 are provided inside the frame portion 31 so as to be unitized with the frame portion 31, to extend rearward, and to be arranged in two (top and bottom) stages, that is, to correspond to plural respective terminal housing chambers 14 arranged in two (top and bottom) stages. Rear end portions of the detection plates 32 arranged in two (top and bottom) stages are provided with detection portions 33 (10 in total) which correspond to the 10 respective ordinary terminal housing chambers 14 arranged in two (top and bottom) stages.

A pair of openings 36 which penetrate in the top-bottom direction are formed at positions that are located outside the five top-stage detection plates 32 in the width direction and correspond to the pair of short-circuit terminal setting spaces 17. Each opening 36 is formed so as not to obstruct communication, in the top-bottom direction, between the short-circuit terminal setting space 17 of the housing 10 and the pair of short-circuit target terminal housing chambers 14 located above it in a state that the front holder 30 is attached to the housing 10.

Figure 5B:
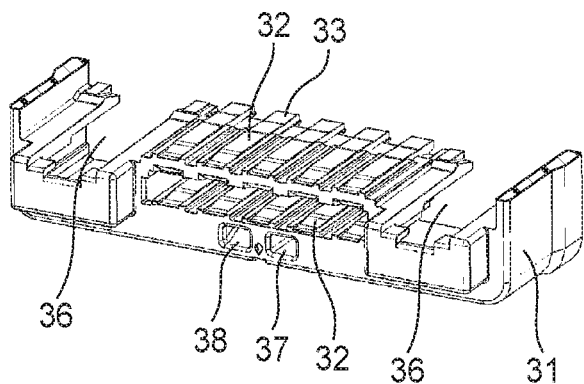
FIG. 5B is a perspective view having a B-B cross section of FIG. 5A.
Figure 5C:
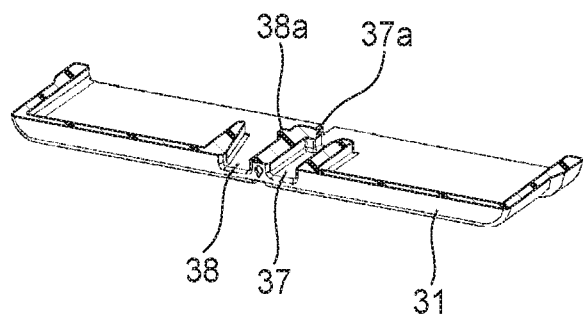
FIG. 5C is a perspective view having a C-C cross section of FIG. 5A.
Figure 6A:
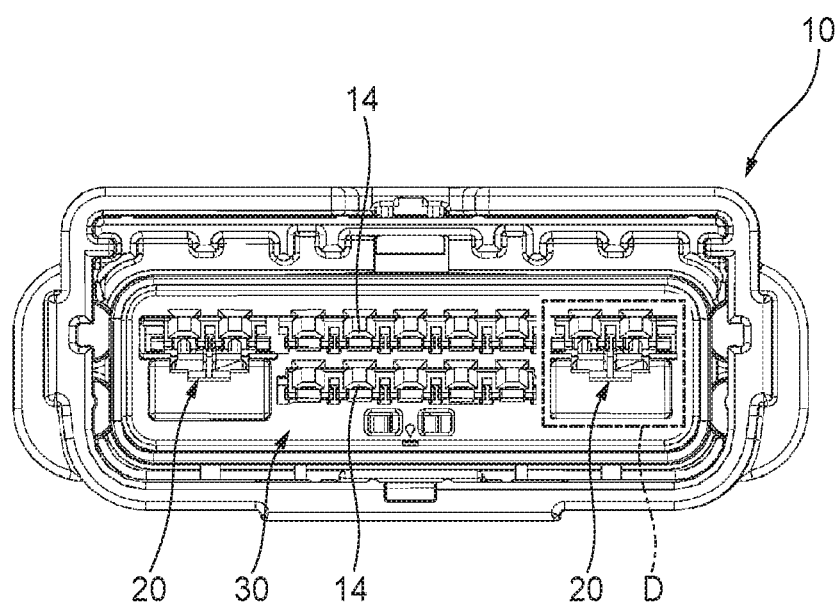
FIG. 6A is a front view of the connector shown in FIG. 2.
Figure 6B:
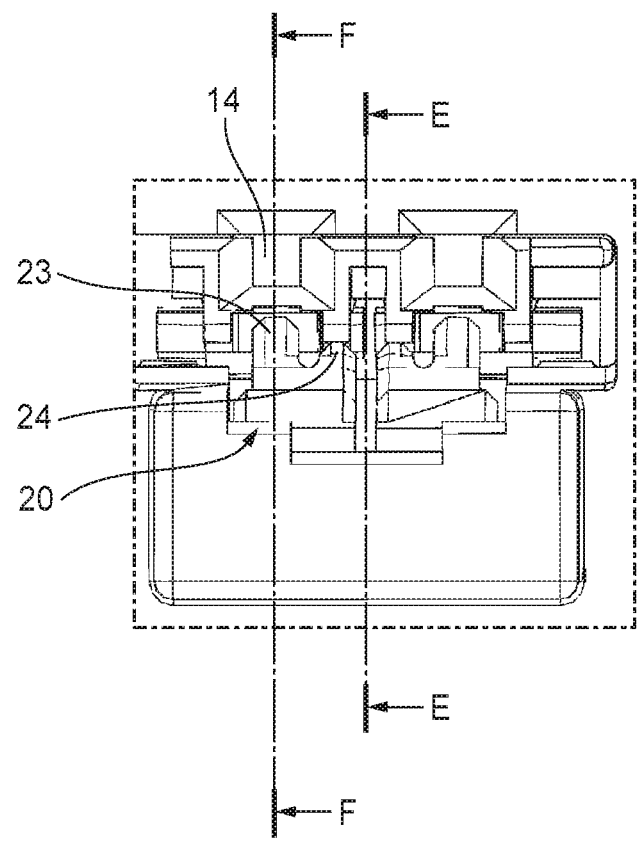
FIG. 6B is an enlarged view of part D in FIG. 6A.

As shown in FIG. 5C in particular, a pair of through-holes 37 and 38 penetrate through, in the fitting direction, a central portion, in the width direction, of a bottom portion of the front holder 30 so as to be arranged in the width direction. The pair of through-holes 37 and 38 are formed with respective projections 37a and 38a which project outward in the width direction. The projections 37a and 38a have a function of locking the front holder 30 at the tentative lock position and the true lock position. This function will be described later in detail. The structures of the individual components of the connector 1 have been described above.

<Attachment of Front Holder 30 to Housing 10>

Figure 7A:
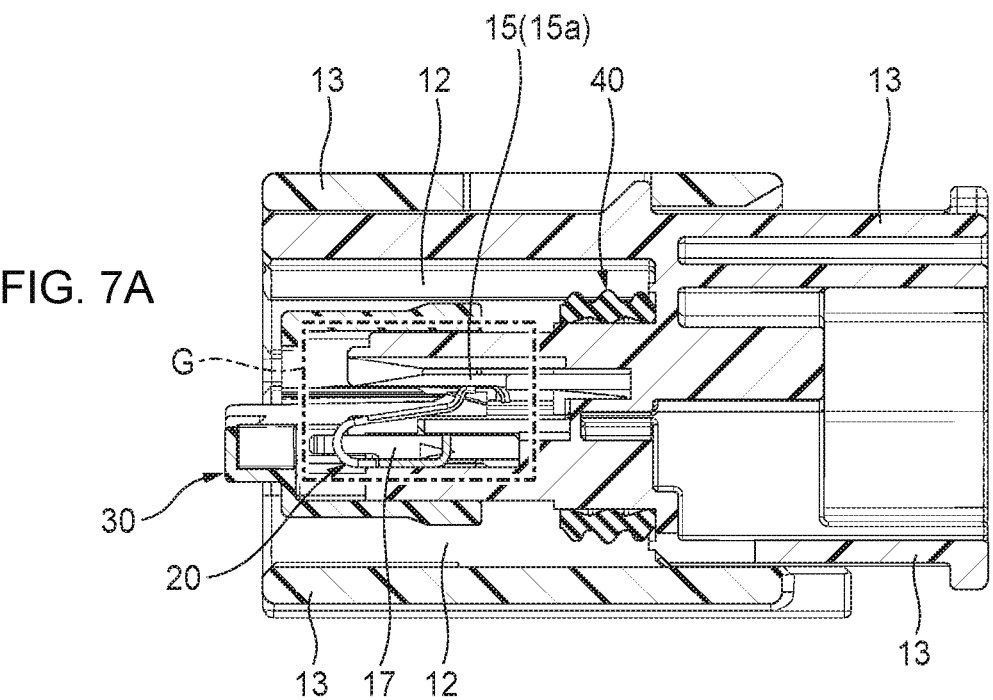
FIG. 7A is an E-E sectional view of FIG. 6B in a state that no short-circuit target terminals are inserted and FIG. 7B is an enlarged view of part G in FIG. 7A.
Figure 7B:
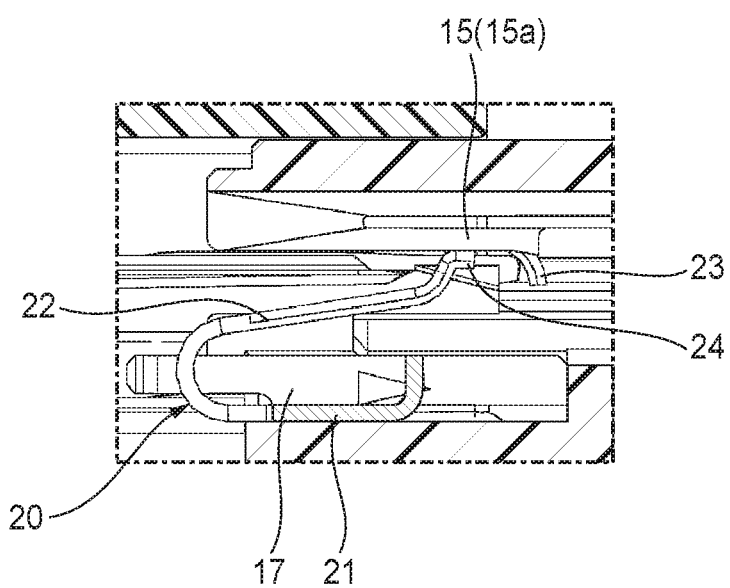
Figure 8A:
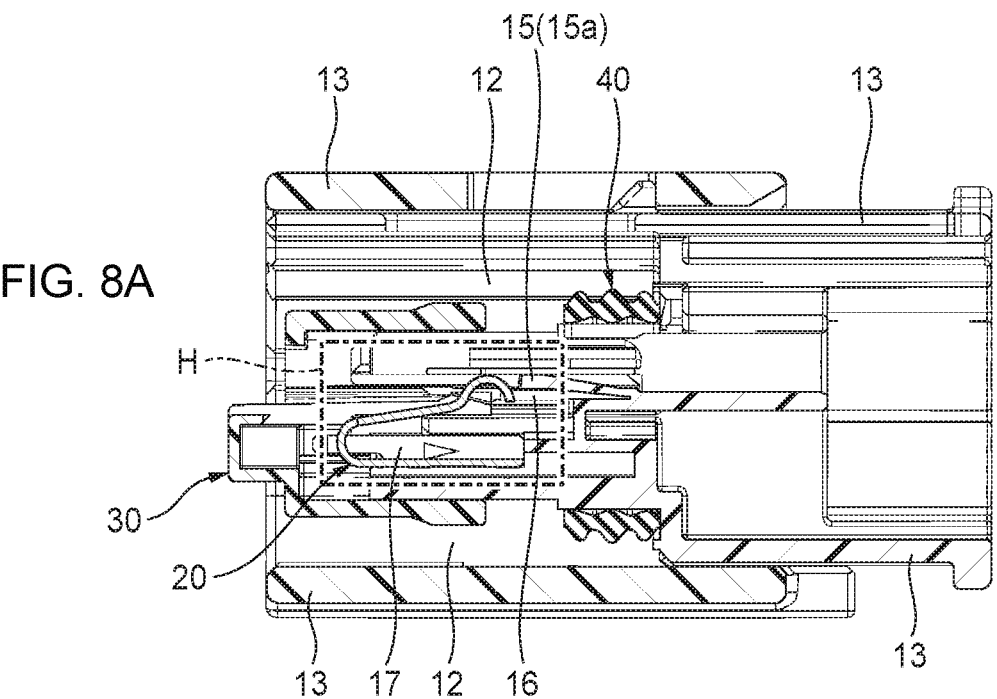
FIG. 8A is an F-F sectional view of FIG. 6B in a state that no short-circuit target terminals are inserted.
Figure 8B:
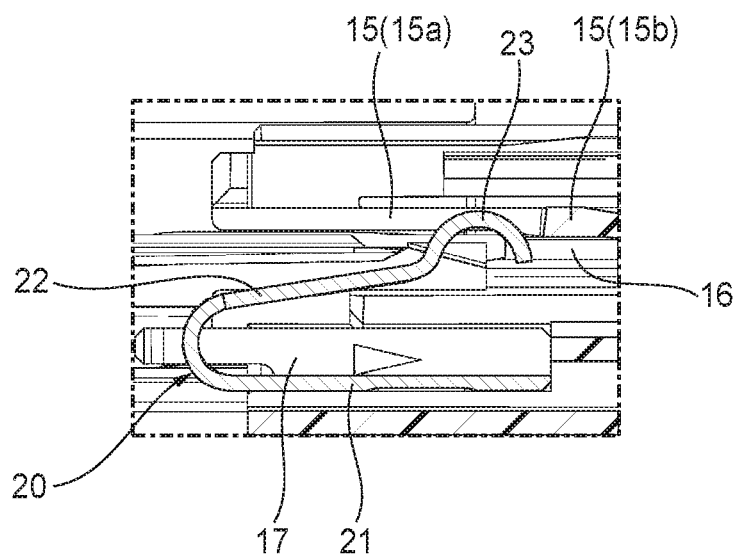
FIG. 8B is an enlarged view of part H in FIG. 8A.

Next, how the front holder 30 is attached to the housing 10 will be described. First, as shown in FIG. 7A etc., a rectangular-cylinder-shaped rubber packing 40 is inserted into the ring-shaped space 12 of the housing 10 from the front side and fixed to the outer circumference of the terminal housing portion 11 at a prescribed position. The outer circumferential surface of the packing 40 is formed with plural (in this example, three) ring-shaped lips. The ring-shaped lips have a function of watertight sealing between the counterpart housing 70 (see FIG. 1) and the housing 10 when the counterpart housing 70 is fitted into the housing 10.

Then, as shown in FIG. 7A, the front holder 30 is inserted into the ring-shaped space 12 from the front side. At this time, the pair of elastic pieces 18 and 19 of the housing 10 are inserted into the through-holes 37 and 38 of the front holder 30, respectively. As the insertion of the front holder 30 proceeds, first, the projection 18a of the elastic piece 18 comes into contact with the projection 37a of the hole 37.

After the contact of the projection 18a with the projection 37a, as the insertion proceeds, the elastic piece 18 is elastically deformed outside in the width direction so that the projection 18a goes up onto the projection 37a. Subsequently, as the insertion proceeds, the projection 18a goes over the projection 37a, whereupon the elastic piece 18 recovers elastically. As a result, the projections 18a and 19a engage with the projections 37a and 38a, respectively, in such a manner that the projection 18a is located in front of the projection 37a and the projection 19a is located in the rear of the projection 38a, whereby the front holder 30 is held at the tentative lock position (see FIG. 7A).

Figure 10A:
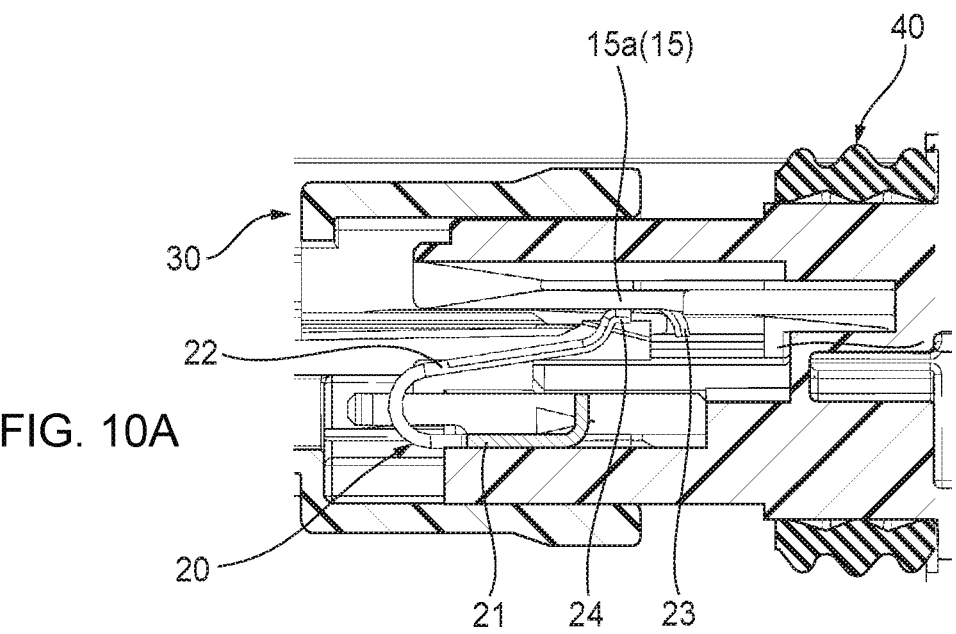
FIG. 10A is a sectional view corresponding to FIG. 7B in a state that the short-circuit target terminals are located at regular insertion positions and FIG. 10B is a sectional view corresponding to FIG. 8B in a state that the short-circuit target terminals are located at the regular insertion positions.
Figure 10B:
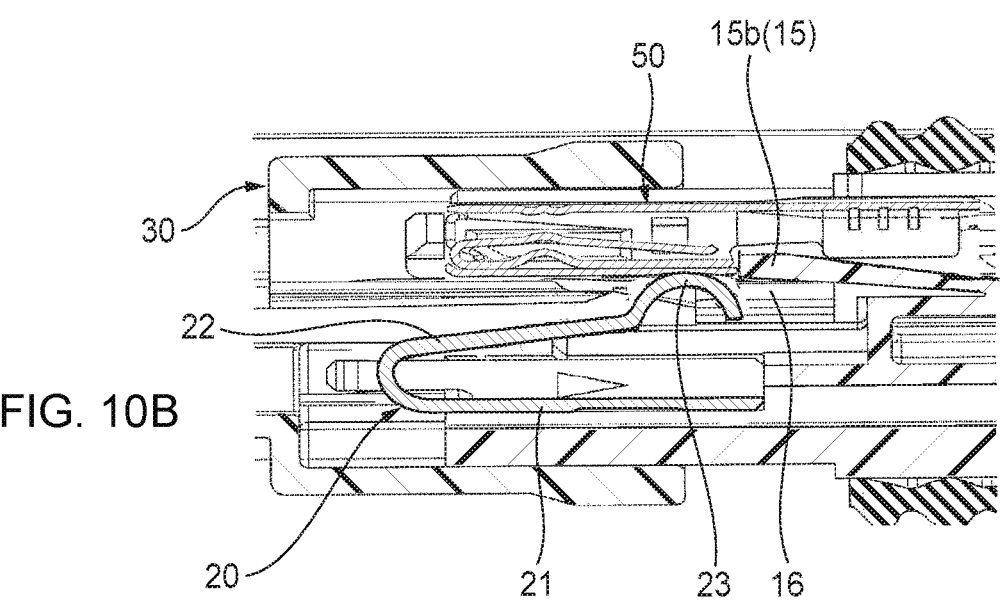

When in this state the terminals 50 are inserted into the respective terminal housing chambers 14 to the regular insertion positions, as described above the lances 15b are kept at the original positions (they have postures shown in FIG. 10B). Thus, a state is established that the detection portions 33 (see FIG. 5B) of the front holder 30 can go into the respective spaces 16 (see FIG. 10B). As a result, in a state that the terminals 50 are located at the regular insertion positions, when the front holder 30 located at the tentative lock position are pushed rearward, the detection portions 33 go into the spaces 16, whereby the front holder 30 is moved to the true lock position. During that course, the projection 19a of the elastic piece 19 goes over the projection 38a of the through-hole 38 and comes to engage with the projection 38a in a state that the projection 19a is located in front of the projection 38a, whereby the front holder 30 is held at the true lock position.

On the other hand, in a state that the terminals 50 are located at halfway insertion positions, as described above the lances 15b maintain the postures (see FIG. 9B) that they are deformed elastically so as to be inclined downward (i.e., in such a direction as to go away from the terminal housing chambers 14). Thus, the tips of the lances 15b interfere with the detection portions 33 and the detection portions 33 cannot enter the spaces 16. As a result, the front holder 30 cannot move from the tentative lock position to the true lock position. In this manner, halfway insertion of the terminals (ordinary terminals) 50 can be detected easily by detecting that the front holder 30 cannot move from the tentative lock position to the true lock position.

<Pushing-Down of Short-Circuit Terminals 20 by Double-Supported Beams 15a of Lock Portions 15>

Next, an action that double-supported beams 15a of lock portions 15 push down each short-circuit terminal 20 will be described. As described above, the push target portions 24 of each short-circuit terminal 20 are located right under double-supported beams 15a of the associated short-circuit target terminal housing chambers 14 (see FIG. 7B).

Thus, when as shown in FIG. 9A the double-supported beams 15a and the lances 15b are deformed downward elastically in a halfway stage of housing of the short-circuit target terminals 50 in the associated short-circuit target terminal housing chambers 14, the double-supported beams 15a that have deformed downward elastically push down the push target portions 24 of the short-circuit terminal 20 (indicated by a white arrow in FIG. 9A). As a result, the push target portions 24 (i.e., contact pieces 22) are pushed down (deformed downward elastically) in link with the double-supported beams 15a, whereby as shown in FIG. 9B the contact point portions 23 of the short-circuit terminals 20 are also moved downward (indicated by a black arrow in FIG. 9B). In the following, this action will be referred to as "pushing-down of each short-circuit terminal 20 by the double-supported beams 15a."

When the insertion of the short-circuit target terminals 50 proceeds further in the above-described state that the "pushing-down of each short-circuit terminal 20 by the double-supported beams 15a" is maintained, tip portions of the short-circuit target terminals 50 start coming into contact with the respective contact point portions 23. The short-circuit target terminals 50 thereafter push down the contact point portions 23 further and go up onto them. And the insertion of the short-circuit target terminals 50 proceeds further while the state that the contact point portions 23 are in contact with the short-circuit target terminals 50 is maintained. When the short-circuit target terminals 50 reach the regular insertion positions in the short-circuit target terminal housing chambers 14, the double-supported beams 15a and lances 15b recover upward elastically and return to their original positions while the contact point portions 23 are kept in contact with the short-circuit target terminals 50 (see FIGS. 10A and 10B).

Workings and advantages of the "pushing-down of each short-circuit terminal 20 by the double-supported beams 15a" will be described below with reference to FIGS. 11A and 11B. First, as a preparation for the description of the workings and advantages, a comparative example in which the "pushing-down of each short-circuit terminal 20 by the double-supported beams 15a" is not performed will be described with reference to FIG. 11A.

Figure 11A:
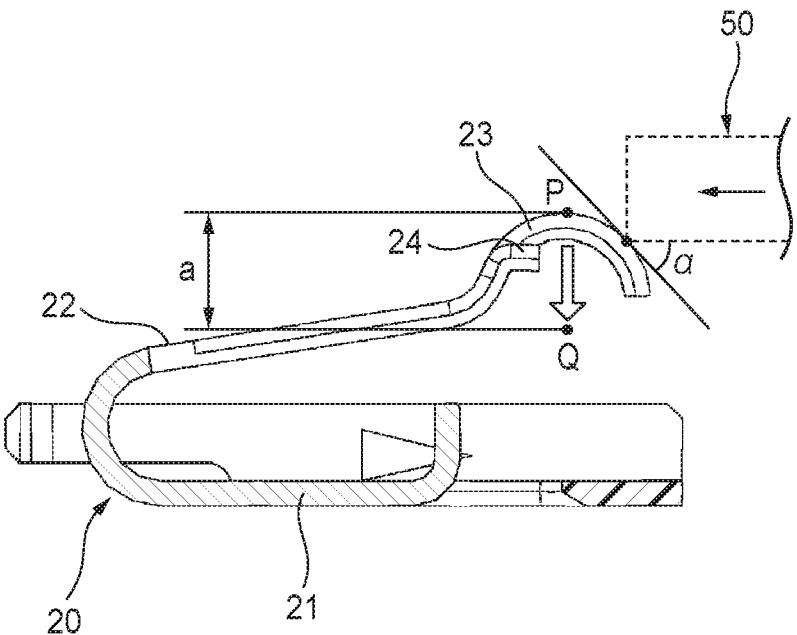
FIGS. 11A and 11B are diagrams for description of an effect of pushing-down of each short-circuit terminal by double-supported beams of lock portions.

In the comparative example, as shown in FIG. 11A, after a tip portion of a short-circuit target terminal 50 starts coming into contact with a contact point portion 23 with a contact angle α, the short-circuit target terminal 50 pushes down the contact point portion 23 by a distance a (P→Q) and goes up onto it.

Figure 11B:
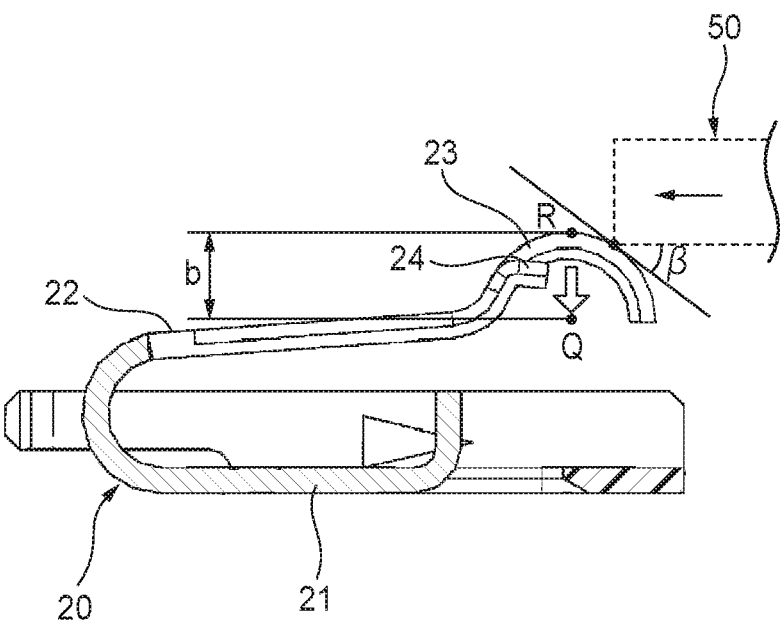

In contrast, in the embodiment, as shown in FIG. 11B, after a tip portion of a short-circuit target terminal 50 starts coming into contact with a contact point portion 23 with a contact angle β in a state that the contact point portion 23 is deformed in advance so as to be located lower than in the comparative example by virtue of the "pushing-down of the short-circuit terminal 20 by the double-supported beams 15a," the short-circuit target terminal 50 pushes down the contact point portion 23 by a distance b (R→Q) and goes up onto it.

As is understood from the comparison between the cases of FIGS. 11A and 11B, in the embodiment the distance of the pushing-down of the contact point portion 23 by the short-circuit target terminal 50 is shorter than in the comparative example (b<a) and the angle of contact of the short-circuit target terminal 50 with the contact point portion 23 at the start of contact is smaller than in the comparative example (β<α). Where the distance of the pushing-down of the contact point portion 23 by the short-circuit target terminal 50 is short, the pressure of contact of the short-circuit target terminal 50 with the contact point portion 23 is lower, as a result of which the force that is necessary to house the short-circuit target terminal 50 in the associated short-circuit target terminal housing chambers 14 (terminal insertion force) is made weaker. In addition, where the angle of contact of the short-circuit target terminal 50 with the contact point portion 23 at the start of contact is small, the component in the fitting direction (in the left-right direction in FIG. 11B) of a friction force occurring at the contact position becomes weaker, as a result of which the terminal insertion force is made weaker.

As described above, in the embodiment, by virtue of the "pushing-down of each short-circuit terminal 20 by the double-supported beams 15a," the distance of pushing-down of the contact point portion 23 by the short-circuit target terminal 50 is shorter and the angle of contact of the short-circuit target terminal 50 with the contact point portion 23 at the start of contact is smaller than in the comparative example, as a result of which the terminal insertion force is made weaker.

Workings and Advantages

As described above, in the connector 1 according to the embodiment and a wire harness employing the connector 1, when the terminals 50 are housed in the respective terminal housing chambers 14, double-supported beams 15a of lock portions 15 for locking short-circuit target terminals 50 come into contact with the push target portions 24 of each short-circuit terminal 20. Then each short-circuit terminal 20 is deformed in link with movements of the double-supported beams 15a so that the pressure of contact of the contact point portions 23 of the short-circuit terminal 20 with the short-circuit target terminals 50 is made lower. This makes it easier to push out each short-circuit terminal 20 to the outsides of the associated terminal housing chambers 14, whereby the terminal insertion force can be made weaker.

Thus, the connector 1 having the above configuration makes it possible to increase both of the certainty of electrical connections between each short-circuit terminal 20 and associated short-circuit target terminals 50 and the efficiency of work of housing the terminals 50 in the terminal housing chambers 14.

Furthermore, each lock portion 15 has beam-shaped support portions capable of elastic deformation (i.e., portions having an elastic warping function) and a contact portion that is moved in link with the support portions and locks the associated terminal 50 by coming into contact with it (i.e., a portion having a lock function). The push target portions 24 of each short-circuit terminal 20 are pushed by respective support portions, whereby the short-circuit terminal 20 is deformed so that the pressure of contact of the short-circuit terminal 20 with the associated short-circuit target terminals 50 is made lower. Since in this manner each pair of lock portions 15 are provided with, as a pair of different portions, the portions (support portions) for pushing down the push target portions 24 of the associated short-circuit terminal 20 and the portions (contact portions) for locking the short-circuit target terminals 50 in the associated terminal housing chambers 14, each lock portion 15 can be designed so that its individual portions are given shapes and positions that are suitable for their respective functions. As a result, the degree of freedom of designing of each lock portion 15 is made higher than in a case that both of the above functions are realized by a single portion, making it possible to increase both of the certainty of electrical connections between each short-circuit terminal 20 and the associated short-circuit target terminals 50 and the efficiency of work of housing the terminals 50 in the respective terminal housing chambers 14.

Other Embodiments

In addition, the invention is not limited to the aforementioned embodiments, but various modifications can be used within the scope of the invention. For example, the invention is not limited to the aforementioned embodiments, but changes, improvements, etc. can be made on the invention suitably. In addition, materials, shapes, dimensions, numbers, arrangement places, etc. of respective constituent elements in the aforementioned embodiments are not limited. Any materials, any shapes, any dimensions, any numbers, any arrangement places, etc. may be used as long as the invention can be attained.

In the above embodiment, by virtue of the "pushing-down of each short-circuit terminal 20 by the double-supported beams 15*a*," each short-circuit terminal 20 is deformed to such an extent that the contact pressure becomes weak though the contact point portions 23 of the short-circuit terminal 20 come into contact with the associated short-circuit target terminals 50. Alternatively, by virtue of the "pushing-down of each short-circuit terminal 20 by the double-supported beams 15*a*," each short-circuit terminal 20 may be deformed to such an extent that the contact point portions 23 of the short-circuit terminal 20 fully leave the associated short-circuit target terminals 50.

In this case, each short-circuit terminal 20 does not obstruct housing of the associated short-circuit target terminals 50 in the respective short-circuit target terminal housing chambers 14 at all. Thus, the efficiency of work of housing the terminals 50 in the respective terminal housing chambers 14 can be increased further. In this configuration, when the short-circuit target terminals 50 reach the regular insertion positions, the double-supported beams 15*a* and the lances 15*b* recover upward elastically and return to their original positions, whereby the contact point portions 23 come into contact with the short-circuit target terminals 50 for the first time.

Furthermore, in the above embodiment, each lock portion 15 is composed of a pair of double-supported beams 15*a* and a lance 15*b* that is located between the pair of double-supported beams 15*a* and the push target portions 24 of each short-circuit terminal 20 are pushed by double-supported beams 15*a* of the associated lock portions 15. Alternatively, each lock portion 15 may be configured in another form (e.g., composed of only a cantilever-shaped lance). As a further alternative, members that push the push target portions 24 of each short-circuit terminal 20 when the associated short-circuit target terminal 50 are housed may be provided as separate members that are independent of members (what is called lances) for locking the short-circuit target terminal 50.

In the above embodiment, the front holder 30 which is attached to the housing 10 from the front side is employed as the "detection member." Alternatively, a rear holder that is attached to the housing 10 from the rear side may be employed as the "detection member." As a further alternative, the "detection member" may be omitted.

For example, the connector 1 according to the embodiment can be used as a component of a wire harness. More specifically, where the connector 1 is employed in a wire harness that is part of a circuit for activating an inflator of a vehicular airbag, it becomes possible to prevent the inflator from suffering an erroneous operation due to static electricity, for example.

Features of the above-described connector 1 and wire harness according to the embodiment of the invention will be summarized below concisely in the form of items [1] to [4]:

[1] A connector (1) comprising:
   a housing (10) having a plurality of terminal housing chambers (14);
   a short-circuit terminal (20) configured to contact two or more terminals (50) housed in two or more of the plurality of terminal housing chambers (14) to electrically short the two or more terminals (50); and
   a deformable portion (15) configured to deform in a direction of moving away from the terminal (50) during housing of the terminal (50) and to deform in a direction of moving closer to the terminal (50) upon the housing of the terminal (50) being finished,
   the short-circuit terminal (20) having, as different portions, a contact point portion (23) to contact with the two or more terminals (50) and a push target portion (24) to contact with the deformable portion (15),
   the short-circuit terminal (20) being configured to reduce its pressure of contact toward the terminal (50) at the contact point portion (23), during the housing of the terminal (50), due to a movement of the push target portion (24) along with the deformable portion (15) being deformed in the direction of moving away from the terminal (50).

[2] The connector (1) according to the item [1], wherein the short-circuit terminal (20) is configured so that the contact point portion (23) goes away from the terminal (50) during the housing of the terminal (50) and that the contact point portion (23) comes into contact with the terminal (50) upon the housing of the terminal (50) is finished.

[3] The connector (1) according to item [1] or the item [2], wherein:

the deformable portion (15) have, as different portions, a beam-shaped elastically deformable support portion (15a) extending in a terminal housing (10) direction and a contact portion (15b) moving along with the support portion (15a) and contacting the terminal (50) to lock the terminal (50); and the support portion (15a) pushes the push target portion (24) of the short-circuit terminal (20) and deforms the short-circuit terminal (20) to reduce the pressure of contact toward the terminal (50) at the contact point portion (23), during the housing of the terminal (50), due to a movement of the support portion (15a) by being pushed by the terminal (50) in the direction of moving away from the terminal (50).

[4] A wire harness comprising:
the connector (1) according to any one of the item [1] to the item [3]; and
a plurality of electric wires each configured to have the terminal (50) housed in the terminal housing chamber (14).

REFERENCE SIGNS LIST

1: Connector
10: Housing
14: Terminal housing chamber
15: Lock portion (deformable portion)
15a: Double-supported beam (support portion)
15b: Lance (contact portion)
20: Short-circuit terminal
23: Contact point portion
24: Push target portion
50: Terminal

The invention claimed is:

1. A connector comprising:
a housing having a plurality of terminal housing chambers;
a plurality of terminals, each of the terminals is housed in a respective one of the terminal housing chambers;
a short-circuit terminal configured to contact a pair of the terminals to electrically short the pair of terminals; and
a deformable portion configured to deform in a direction of moving away from a respective one of the pair of terminals during housing of the respective one of the pair of terminals and to deform in a direction of moving closer to the respective one of the pair of terminals upon the housing of the respective one of the pair of terminals being finished,
the short-circuit terminal having, as different portions, a contact point portion to contact with the respective one of the pair of terminals and a push target portion to contact with the deformable portion,
the short-circuit terminal being configured to reduce its pressure of contact toward the respective one of the pair of terminals at the contact point portion, during the housing of the respective one of the pair of terminals, due to a movement of the push target portion along with the deformable portion being deformed in the direction of moving away from the respective one of the pair of terminals.

2. The connector according to claim 1, wherein
the short-circuit terminal is configured so that the contact point portion goes away from the respective one of the pair of terminals during the housing of the respective one of the pair of terminals and that the contact point portion comes into contact with the respective one of the pair of terminals upon the housing of the respective one of the pair of terminals is finished.

3. The connector according to claim 1, wherein:
the deformable portion has, as different portions, a beam-shaped elastically deformable support portion extending in a terminal housing direction and a contact portion moving along with the support portion and contacting the respective one of the pair of terminals to lock the respective one of the pair of terminals; and
the support portion pushes the push target portion of the short-circuit terminal and deforms the short-circuit terminal to reduce the pressure of contact toward the respective one of the pair of terminals at the contact point portion, during the housing of the respective one of the pair of terminals, due to a movement of the support portion by being pushed by the respective one of the pair of terminals in the direction of moving away from the respective one of the pair of terminal.

4. A wire harness comprising:
a housing having a plurality of terminal housing chambers;
a plurality of terminals, each of the terminals is housed in a respective one of the terminal housing chambers;
a short-circuit terminal configured to contact a pair of the terminals to electrically short the pair of terminals; and
a deformable portion configured to deform in a direction of moving away from a respective one of the pair of terminals during housing of the respective one of the pair of terminals and to deform in a direction of moving closer to the respective one of the pair of terminals upon the housing of the respective one of the pair of terminals being finished,
the short-circuit terminal having, as different portions, a contact point portion to contact with the respective one of the pair of terminals and a push target portion to contact with the deformable portion,
the short-circuit terminal being configured to reduce its pressure of contact toward the respective one of the pair of terminals at the contact point portion, during the housing of the respective one of the pair of terminals, due to a movement of the push target portion along with the deformable portion being deformed in the direction of moving away from the respective one of the pair of terminals; and
a plurality of electric wires each connected to a respective one of the plurality of terminals.

* * * * *